L. C. WETZEL.
WEIGHING SCALE.
APPLICATION FILED DEC. 6, 1912.

1,324,574.

Patented Dec. 9, 1919.
7 SHEETS—SHEET 1.

Witnesses
Martin C. Olsen.
Robert Dobberman

Inventor
Lewis C. Wetzel
By Rector Hibben Davis & Macauley
Attys.

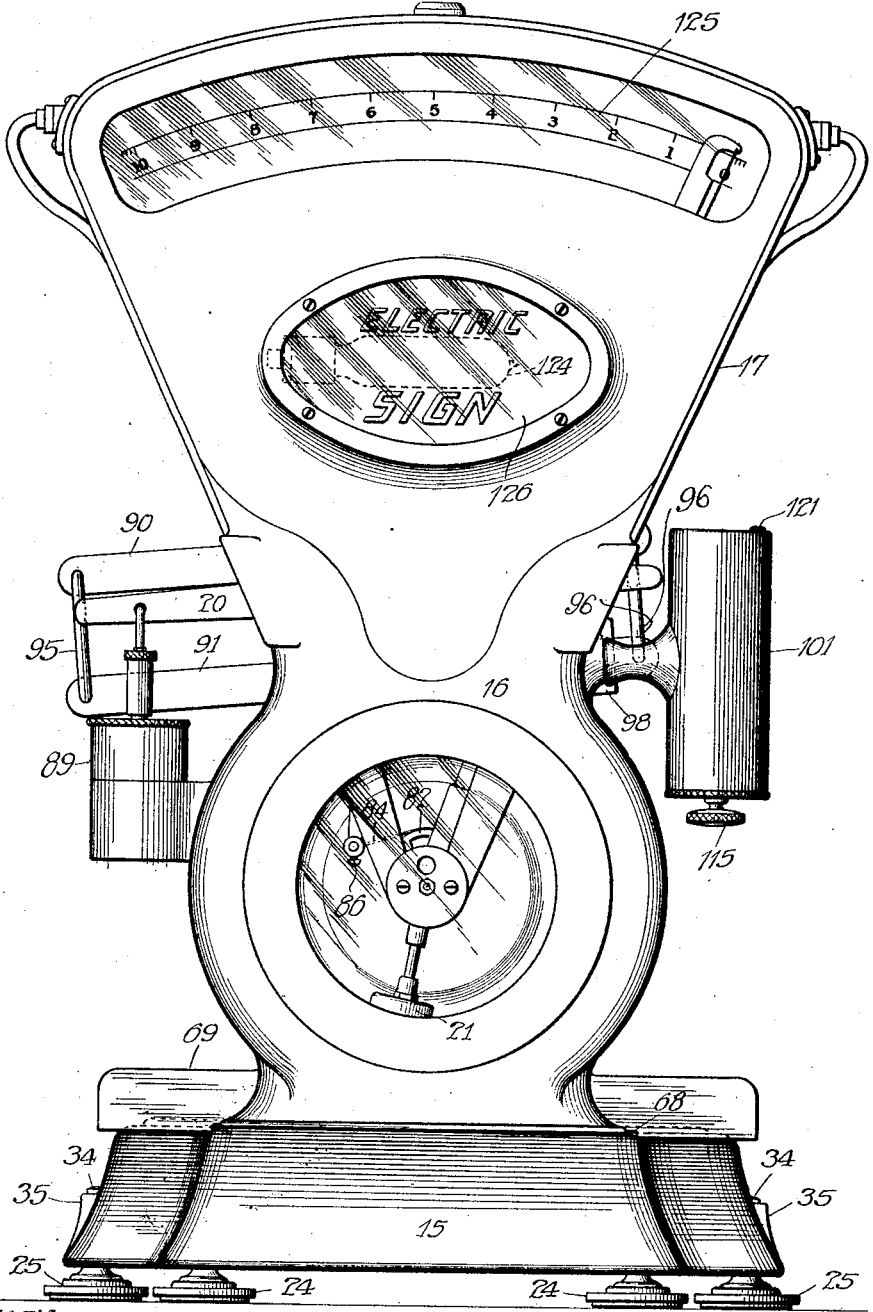

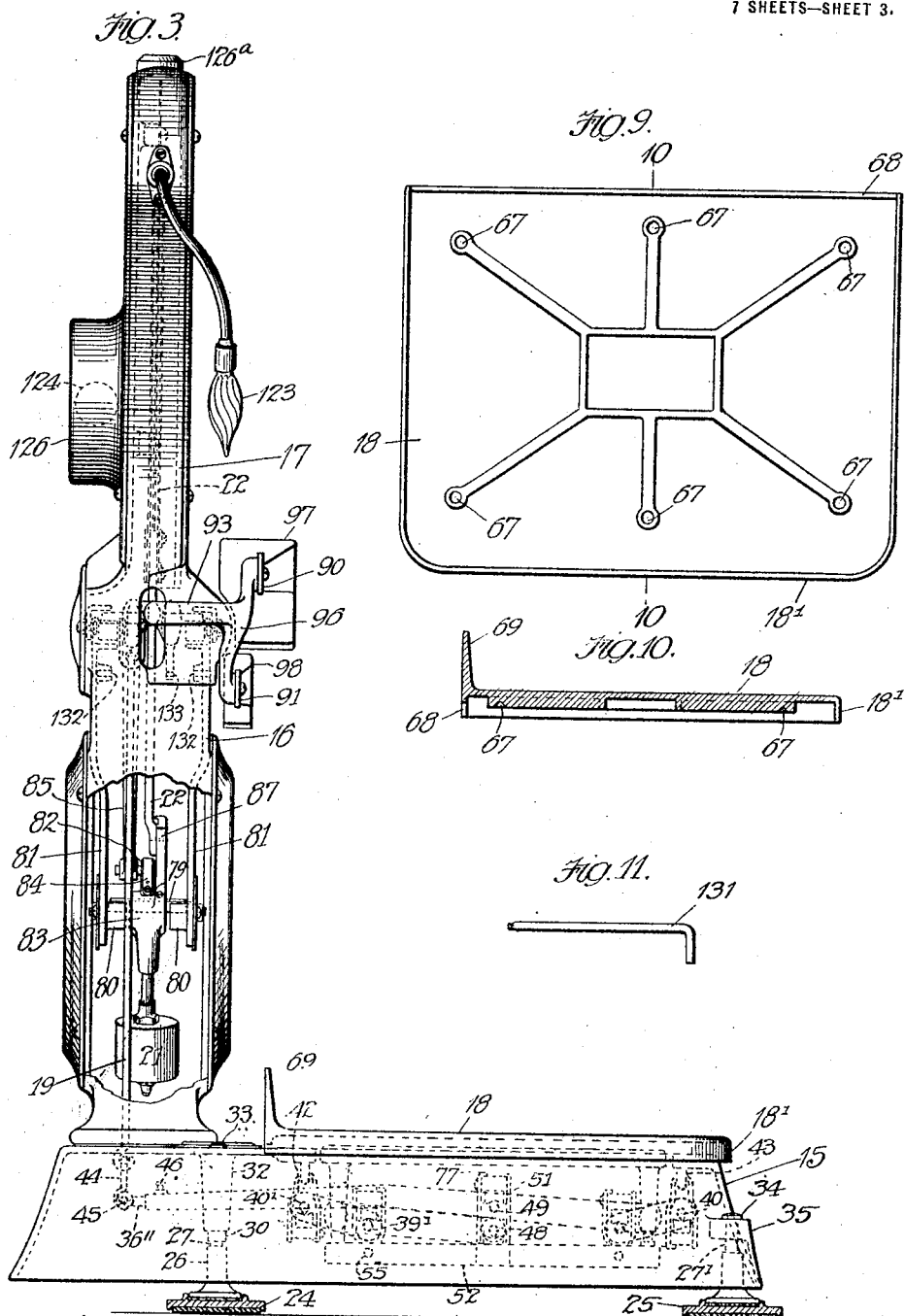

L. C. WETZEL.
WEIGHING SCALE.
APPLICATION FILED DEC. 6, 1912.
1,324,574.
Patented Dec. 9, 1919.
7 SHEETS—SHEET 4.
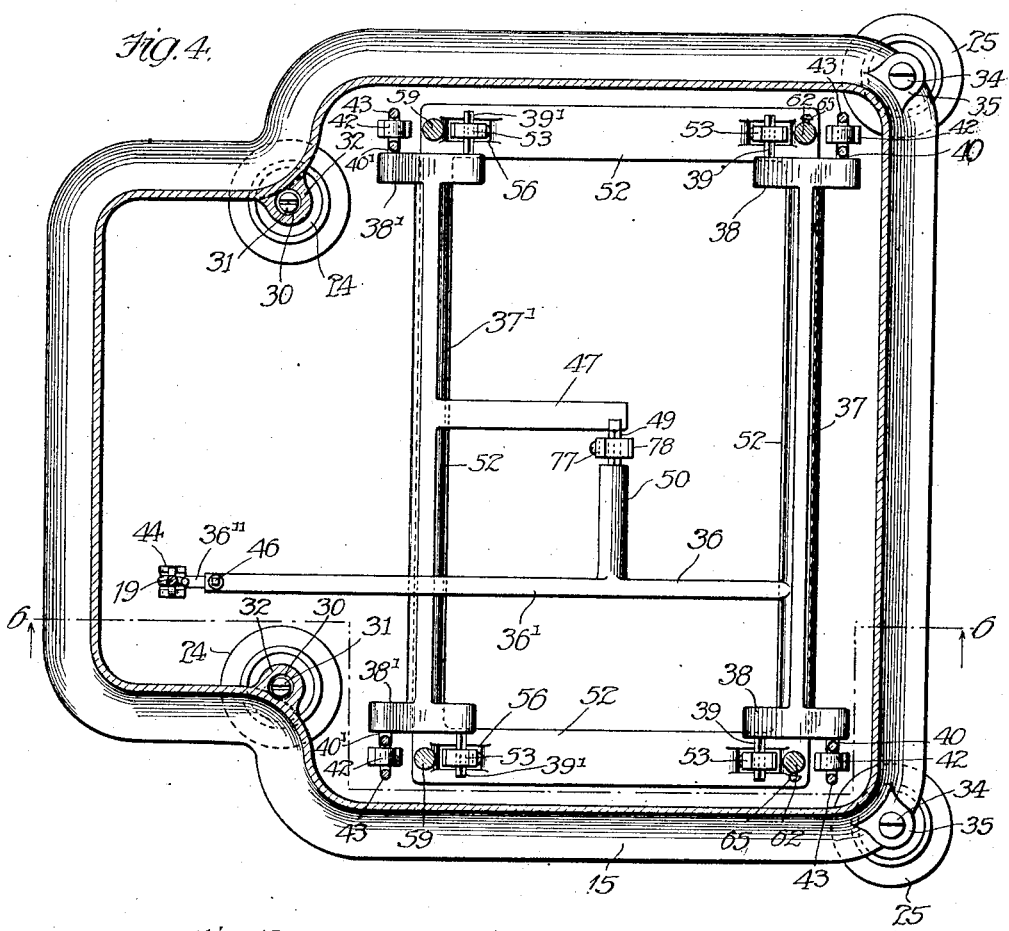
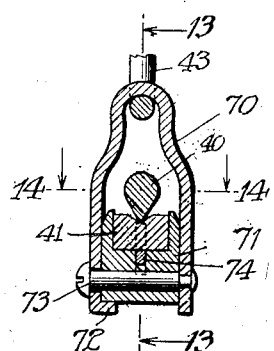
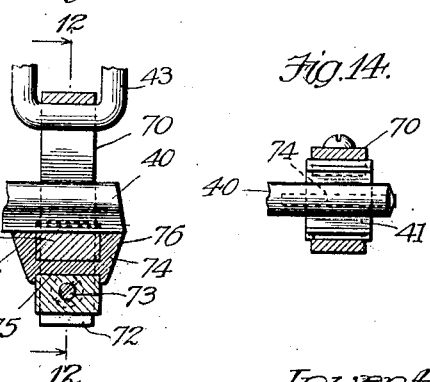
Witnesses
Martin H. Olsen
Robert Dobberman
Inventor
Lewis C. Wetzel
By Rector Hibben Davis & Macauley
Attys

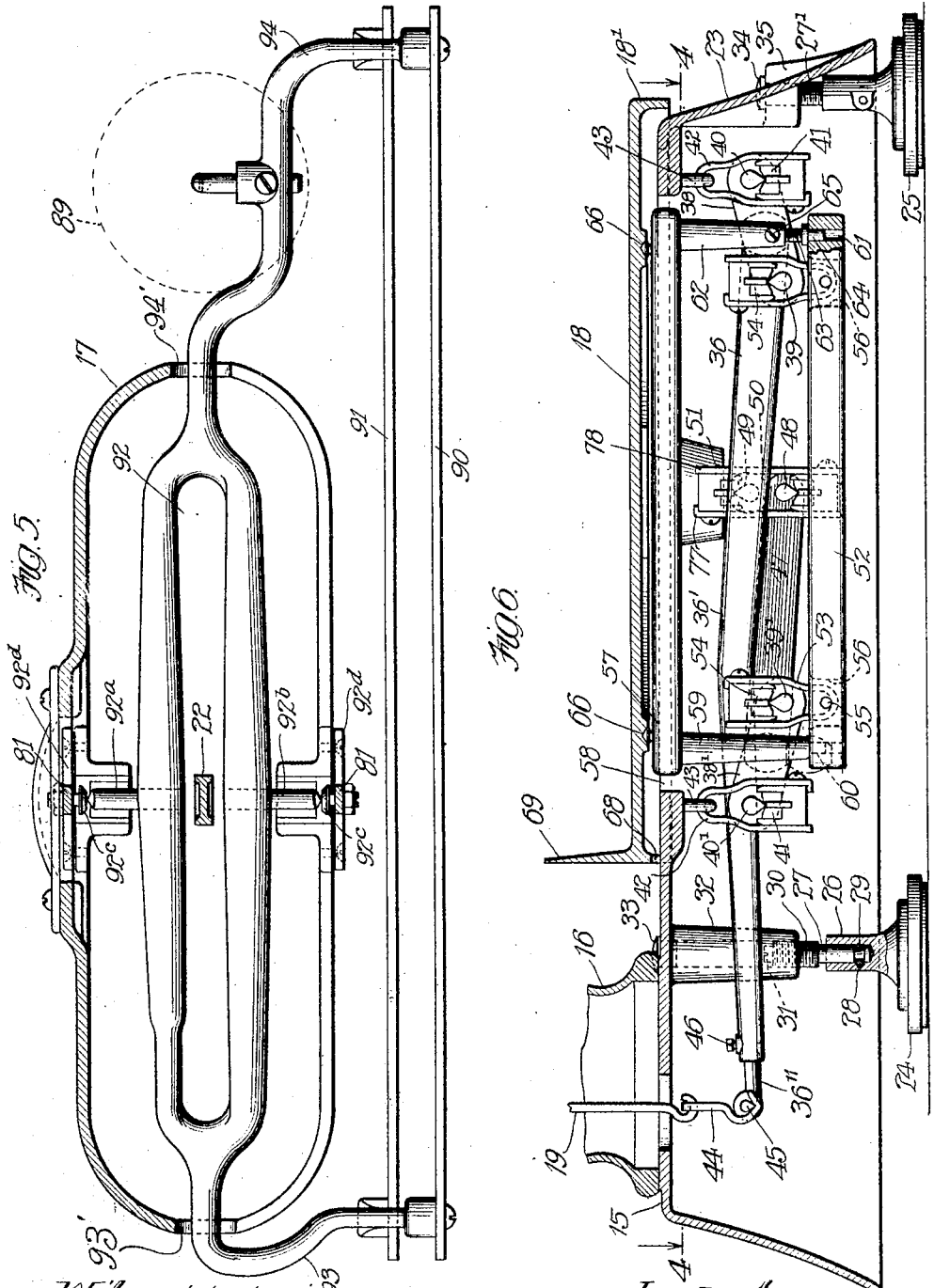

L. C. WETZEL.
WEIGHING SCALE.
APPLICATION FILED DEC. 6, 1912.
1,324,574.
Patented Dec. 9, 1919.
7 SHEETS—SHEET 6.
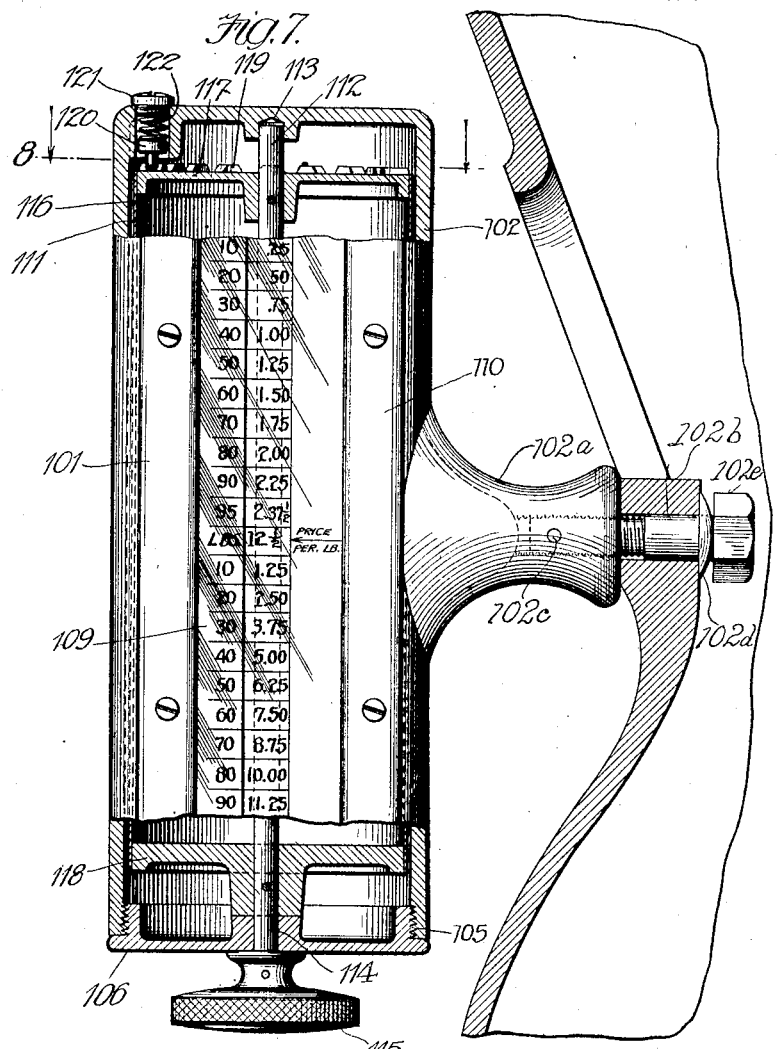
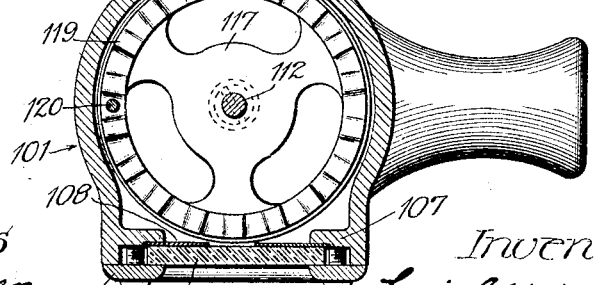

L. C. WETZEL.
WEIGHING SCALE.
APPLICATION FILED DEC. 6, 1912.

1,324,574.

Patented Dec. 9, 1919.
7 SHEETS—SHEET 7.

Witnesses
Martin H. Olsen.
Robert Dobberman

Inventor
Louis C. Wetzel
By Rector Hibben Davis & Macauley
Attys

UNITED STATES PATENT OFFICE.

LEWIS CALVIN WETZEL, OF TOLEDO, OHIO, ASSIGNOR, BY MESNE ASSIGNMENTS, TO TOLEDO SCALE COMPANY, OF NEWARK, NEW JERSEY, A CORPORATION OF NEW JERSEY.

WEIGHING-SCALE.

1,324,574.     Specification of Letters Patent.     Patented Dec. 9, 1919.

Application filed December 6, 1912. Serial No. 735,271.

*To all whom it may concern:*

Be it known that I, LEWIS C. WETZEL, a citizen of the United States, residing at Toledo, in the county of Lucas and State of Ohio, have invented certain new and useful Improvements in Weighing-Scales, of which the following is a specification.

My invention is described specifically in the following specification as embodied in an automatic computing, platform, pendulum scale to which it is well adapted, but it will be understood that it is not limited to scales of this type but is applicable in its various features to other types of scale; moreover the invention is not confined to the specific construction which is described for the purpose of exemplification only, and, in the following claims I have endeavored to clearly point out my invention and distinguish it from the prior art in so far as the same is known to me, without, however, relinquishing or dedicating to the public any portion thereof.

Figure 1:
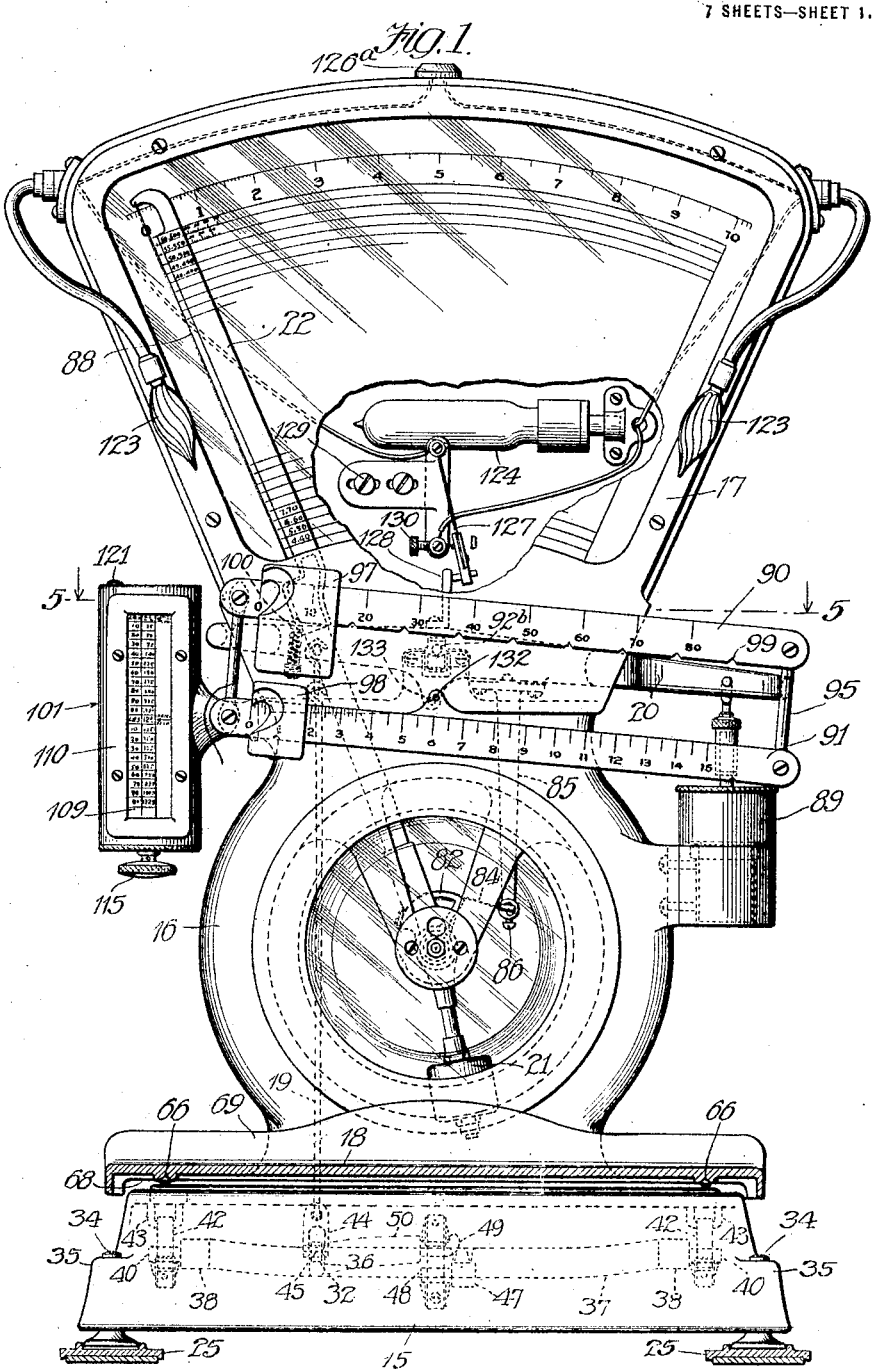
Figure 15:
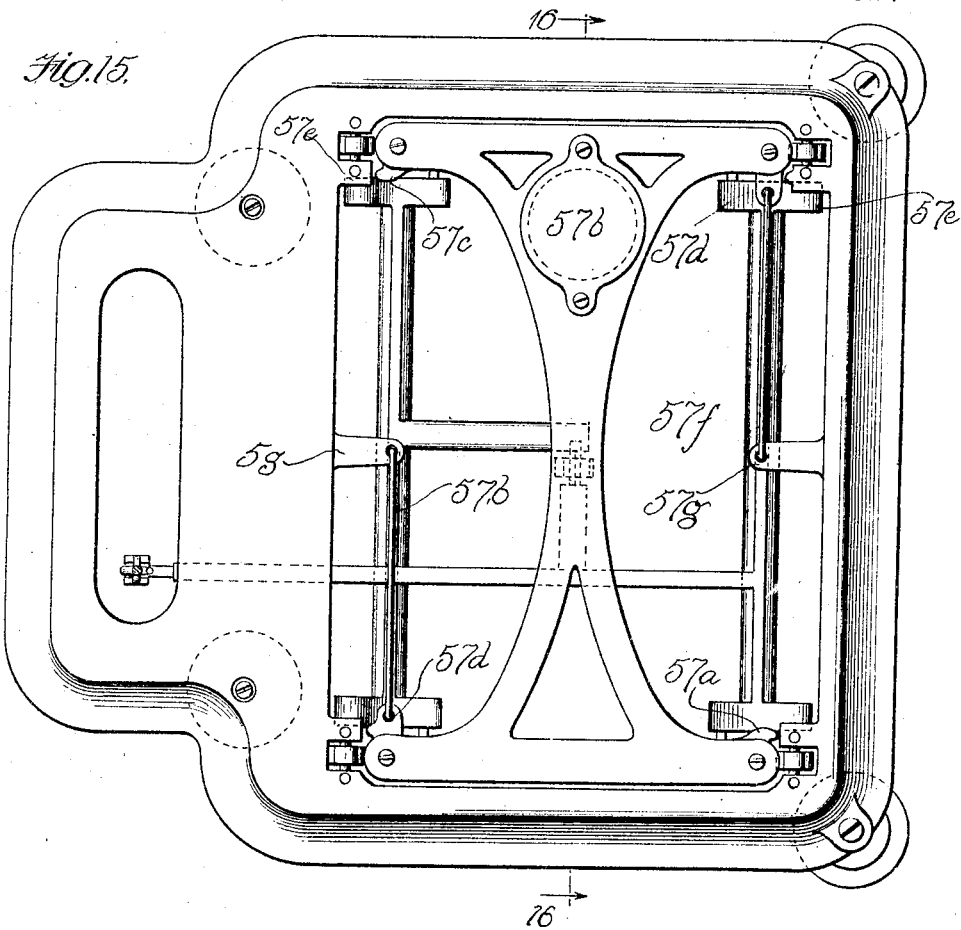
Figure 16:
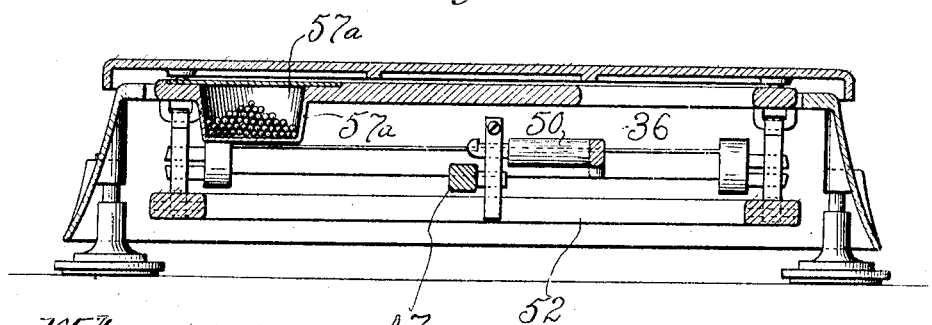

In the accompanying drawings forming part of this application, Figure 1 is a front elevation of the scale, partly in section, however, to reveal certain interior construction to be referred to later; Fig. 2 is a rear elevation of the same; Fig. 3 is a side elevation showing the casing partly broken away to reveal the interior construction; Fig. 4 is a horizontal section upon the line 4—4 of Fig. 6 through the base of the scale; Fig. 5 is a horizontal section upon the line 5—5 of Fig. 1; Fig. 6 is a vertical section through the broken line 6—6 of Fig. 4; Fig. 7 is an elevation partly in vertical section on an enlarged scale of a computing device forming part of the scale, as seen in Fig. 1; Fig. 8 is a section through the line 8—8 of Fig. 7 looking in the direction of the arrows; Fig. 9 is a bottom plan of the scale platform; Fig. 10 a section of the same through the line 10—10 of Fig. 9; Fig. 11 is a side elevation of a detail to be described later; Fig. 12 is a vertical section through the line 12—12 of Fig. 13; Fig. 13 is a section through the line 13—13 of Fig. 12; Fig. 14 a horizontal section through the line 14—14 of Fig. 12 showing a detail to be described later; Fig. 15 is a plan view of the scale base and spider with the platform removed and Fig. 16 is a vertical section on the line 16—16 of Fig. 15 looking in the direction of the arrows.

In the particular scale chosen to exemplify my invention a hollow base 15 supports at one end a housing 16 upon which is mounted a fan-shaped casing 17 for the indicator chart. As shown the housing and casing are substantially integral with each other and separable from the base, though this is not essential. The hollow base contains a leverage system upon which is mounted a goods receiver or platform 18 as is common in scales of this character, and the leverage system is connected by a link 19 with a substantially horizontal beam 20 in the housing or intermediate the same and the chart casing, the beam being connected to a pendulum counterbalance 21 and the indicator hand 22 of the scale (see dotted lines Fig. 1) in a manner to be hereinafter described.

The skirt or flange 23 of the base is adapted to be supported slightly above but substantially parallel to a plane surface upon which the scale is placed by four feet 24—24, 25—25, which are adjustable vertically to secure the proper leveling or adjustment of the scale (see Fig. 6). For this purpose the feet 24 are extended into sockets 26 which receive the lower ends of screw pins 27 which are free to turn therein but held from longitudinal movement by cross pins 28 engaging within grooves 29 in the pins.

The upper ends of the screw pins are threaded at 30 and provided with kerfs 31 for engagement by a suitable tool. The threaded portion of each pin is received within the tapped bore of a depending boss 32 cast upon the underside of the base. The upper end of the bore is preferably closed by a screw plug 33 to exclude dirt. The feet 25 at the forward corners of the scale base are similar to the feet 24 and receive the lower ends of screw pins 27′ similar to the screw pins 27, but provided at their upper ends with flattened heads 34 for engagement with the upper surface of shoulders 35 cast upon the base. The threaded portions of the screw pins 27′ engage interior threads tapped into the openings through the shoulders, and provide a ready adjustment for the forward end of the scale, the heads of the screw pins being grooved as usual for the engagement of a tool and accessible from the outside of the scale.

The leverage system which supports the scale platform is best seen by reference to Figs. 4, 6, 12, 13 and 14. As is common in scales of this character, it comprises two levers, both of which are fulcrumed upon the base, one linked to the scale beam and the other linked to the former. The main lever 36 comprises a cross shaft 37 which is provided at its opposite ends with cross heads 38—38 at the opposite ends of which are mounted the knives 39—40. The knives 39 are upwardly directed for a purpose which will be presently described, but the knives 40 are downwardly directed, their edges resting upon agates 41 carried by stirrups 42 which are suspended from staples or eyes 43 cast into or secured to the under face of the base top, as clearly shown in Fig. 6. The long arm 36' of the lever is preferably formed integral with the cross shaft 37 and extends beneath the housing upon the rear of the base, where it is connected by the yoke 44 and knives 45 with the link 19, above referred to, by which the scale beam 20 is operated from the platform. In order to secure the proper adjustment of the knife 45 the outer end of the lever arm 36' is made adjustable, it being formed in telescopic sections for this purpose, the outer section $36^2$ being adjustable within the main body of the arm, and a screw 46 provided for locking the parts in proper adjustment. The second lever is provided with a shaft 37' similar to shaft 37 and having similar cross heads 38' and knives 39' and 40', the latter of which are supported by stirrups 42 from the scale base. The longer arm 47 of the second lever is provided with a downwardly directed knife 48 at its end, which extends laterally below a similar but upwardly directed knife 49 projecting from a stud or arm 50 upon the lever 36. The two knives are joined by a link 51 which transmits pressure from the second lever to the first or main lever.

The platform 18 is suspended from or supported by the knives 39—39' of the main and secondary levers, a rectangular underframe 52 being directly suspended from said knives 39—39' by means of stirrups 53, carrying agates 54 which engage said knives, and embracing cross pins 55 mounted in the openings 56 in said frame. A rectangular spider 57 extends through a similarly shaped opening 58 in the top of the base, its depending legs 59 being reduced at their lower ends 60 and entering openings 61 formed at the corners of the above-described frame 52, the forward pair of legs being longitudinally adjustable for the purpose of leveling the platform. To this end they are each made in two sections, the upper section 62 being bored and tapped at its lower ends to receive the threaded upper ends 63 of the end sections 64 which are received within the perforations 61 of the frame. Set screws 65 are provided for securing the parts in adjusted position. The spider 57 is provided on top with cone projections 66 which engage similar depressions 67 formed in the bottom of the platform to secure the latter in proper relative position upon the spider. A shot box $57^a$ is carried by the spider and preferably formed integral therewith though if desired it may be formed in a plate attached thereto, and a cover plate $57^b$ closes the opening thereof. The spider is further provided with lugs $57^c$, $57^c$, which abut against shoulders or projections $57^e$, $57^e$, formed on the base to prevent excessive motion of the spider in one direction, motion in the other direction being prevented by links $57^f$, $57^f$, entering at their opposite ends, openings in ears $57^g$, $57^g$, and $57^d$, $57^d$, on the scale base and spider respectively. Thus excessive motion in any direction is prevented. The platform is formed with a depending flange or apron 18' which surrounds the upper edge of the scale base on the sides and in front to prevent foreign matter or dirt from falling into the mechanism, but is cut away at the back as at 68 to avoid contact with the top of the scale base. At the rear the platform is also provided with an upwardly extending flange 69 to prevent the material being weighed extending over or dropping on to the scale base where it is unprotected by the flange 18'.

The stirrups 42 are all similar in construction and are shown in detail in Figs. 12, 13 and 14. They each comprise a strap or loop 70 and a casting 71, which latter forms a seat for the agate 41 and is embraced between the arms of the loop, one of which arms is bent inwardly as at 72 to prevent the casting from turning. The parts are firmly secured together by a screw 73 extending through the block or casting and the loop or strap on opposite sides thereof. Endwise motion of the agate 41 with reference to its seat 71 is prevented by a plate 74 died out as shown in Fig. 13 to extend beneath the agate in a transverse recess 75 in the seat 71 and formed with heads 76—76 which overlap said seat block and agate for this purpose.

The link 49 is provided with agates which are mounted in a manner similar to that just described, there being, however, two agates facing each other and the seat blocks thereof held between separate sides plates 77—78, each of which is turned over at one end to secure the seat blocks in place, as is clearly seen in Fig. 6.

As heretofore stated, the leverage system is connected to the beam 20 of the scale by the link 19. Beneath the beam and within the housing the pendulum 21 is suspended by a knife 79 from seats 80—80 formed upon brackets 81—81 depending from the front and rear walls of the housing. The segment 82 is formed integral with or secured to the casting 83 to which the pendulum is attached and in which the knife 79 is mounted, and coöperates with a band or ribbon 84 which is secured at one end thereto, and at its other end to an arm 85 depending from the scale beam 20. The end of the ribbon 84 is clamped within an opening formed in the end of arm 85 by means of a set screw 86. The casting 83 is further formed or provided with a curved arm 87 to which is secured the index hand or pointer 22 which extends over the chart, as shown in Fig. 1, and is provided with a lining wire 88.

It will be obvious that the weight of any commodity placed upon the platform will be supported by the main and central levers and through the former exert a pull upon the scale beam, which in turn will raise the pendulum until the system is again in equilibrium, when the weight or value of the commodity at any particular price per unit of weight may be read upon the chart.

Violent motion and prolonged vibration of the parts are prevented by a dash-pot 89 of any suitable construction.

The scale as so far described is adapted to weigh accurately under all atmospheric conditions up to the capacity of the pendulum to counterbalance the weight upon the platform. It is sometimes desirable, however, to weigh articles weighing beyond the normal capacity of the scale. For this purpose I have equipped the scale beam with a pair of auxiliary beams 90—91 rigidly connected thereto, as best shown in Fig. 5, and extending in front of a housing. As shown in the figure just referred to the beam 20 is formed with a longitudinal opening or slot 92 the knives 92$^a$ and 92$^b$ being connected to the opposite legs of the beam. To avoid longitudinal movement thereof headed plugs 92$^c$, 92$^c$ are adjustably secured in plates 92$^d$, 92$^d$ secured to the brackets 81—81 referred to above.

The indicator hand 22 extends through the longitudinal slot 92 which is made of a sufficient length to permit the free movement of said hand, and at the opposite ends of the slot the branches of the lever are united and formed into forwardly extending horns 93—94 which extend through side openings 93', 94' in the housing and are diverted slightly upward to support the upper auxiliary beam 90, and then extended downward to form supports for the lower auxiliary beam 91. The auxiliary beams are suitably graduated and provided with poises 97 and 98, the upper of which is much larger than the lower, and used preferably only for increasing the capacity of the scale, while the lower poise may also be used, if desired, for weighing tare. The beam 90 is provided at suitable points with reference to the graduations thereof, and upon its lower edge, with notches 99, and the poise 97 with a spring follower or dog 100 for engagement therewith to normally hold the poise in any position to which it may be adjusted, the walls of the notches and the nose of the follower, however, being so tapered that a moderate pressure will back the follower out of the notch and permit the poise to be longitudinally adjusted. Obviously the automatic computing chart of the scale can only be used for weights within the capacity of the pendulum counterbalancing mechanism.

In order to readily compute the value of the weight which is counterbalanced upon the auxiliary beams, I have provided a manually operated computing device 101 attached to the scale, as shown in Fig. 1, details of which are more fully shown in Figs. 7 and 8. A cylindrical casing 102 permanently closed at one end is closed by a screw cap 106 at the other end 105 and attached to the scale housing at a point just below opening 93' by a pivot connection to permit the cylinder to be turned to a convenient reading position. For this purpose the casing is formed with an integral boss 102$^a$ into which is tapped a screw bolt 102$^b$, a pin 102$^c$ preventing unscrewing thereof. The shank of the bolt is revoluble in a bore in the casing, there being a washer 102$^d$ between the head of the bolt 102$^c$ and the wall of the casing to avoid undue friction. The casing is also formed with a longitudinal reading window 107, partly covered by a card 108 bearing two series of weight numerals, and closed by a glass 109 secured in place by a frame 110. Within the casing is mounted a cylindrical chart 111, the shaft 112 of which is stepped at its upper end in a bearing 113 formed in the upper wall of the casing, and which is journaled at its lower end in a bore 114 in the closure cap 106, the shaft being provided beneath said cap with a knurled wheel 115, for rotating the same. The reading surface 116 of the chart may consists of paper, sheet metal or other light material and is secured upon upper and lower circular heads 117—118, the former of which is formed upon its upper surface with a series of tapered lugs 119 which co-act with a spring-pressed follower 120 to yieldingly hold the cylinder in any position into which it may be turned. Between the follower 120 and the screw plug 121 a spring 122 is provided to exert the required pressure upon the follower. The number of lugs 119 correspond to the number of longitudinal columns of computations upon the cylinder so that the latter may be locked with any column desired opposite the reading opening but will yield to a moderate turning pressure exerted upon the narrow wheel 115. Upon the drum or chart are printed longitudinal rows representing value computations at various prices per unit of weight, each computation corresponding to the weight numeral upon the card with which it is horizontally in register. At the head of each vertical column of computations is placed the price per pound corresponding to these computations. In the illustration in Fig. 7 the prices per pound do not appear for the reason that the upper part of the chart is shown in section to better illustrate the mechanism. The operation of the device, however, will be understood from the consideration of the lower half of the chart, thus in the column which is in view in Fig. 7 the price per pound is 12½ cents so that we find opposite the ten pound mark on the glass 1.25, opposite the twenty pound numeral 2.50 and so on.

If the weight only is to be read, that indicated upon the automatic fan-shaped chart is added to the sum of the indications upon the auxiliary beams. If, however, the total value at a certain price per unit of weight be desired the weight indications upon the auxiliary beams are noted and added together, their computed total value at the required price per unit of weight found from the manually operated computing mechanism and added to the computation showing on the automatic chart.

The scale is further provided with mechanism for automatically lighting up the chart and a sign upon the customers' side of the scale when an article to be weighed is placed upon the scale platform. This lighting means is best shown in Figs. 1 and 2. A pair of lamps 123—123 is conveniently mounted with reference to the computing chart, and a third lamp 124 is mounted within the chart casing but on the customers' side of the chart to illuminate the customers' reading arc 125 (see Fig. 2) and an advertising or other sign 126. These lamps as shown in Fig. 1 are mounted in series and supplied with current from any suitable source through the outlet 126ª, the circuit being closed through a pendant swinging switch 127 when the beam of the scale is tilted as by the addition of weight upon the platform which causes the lug 128 to move to the left (as shown in Fig. 1) and permit the switch to close. Relative adjustment of the switch is provided by the screw and slot attachment 129 and the screw contact 130.

When it is desired to render the scale inoperative as for example for shipment this may be done by inserting the pin 131 into holes 132 and 133 in the casing and beam respectively, the holes having previously been brought into register for the purpose and the beam slightly lifted off its bearings.

I claim:

1. In a weighing scale, a frame, a scale platform mounted thereon, a longitudinally divided scale beam, connections from the platform thereto, a downwardly extending arm on the scale beam, a pendulum pivoted beneath the arm, connections from the arm to the pendulum, and an indicating hand extending through the opening in the beam.

2. In a weighing scale, a frame, a goods receiver mounted on the frame, a housing mounted on the frame, a beam within the housing, connections from the goods receiver to the beam, automatic weight offsetting means connected to the beam, the latter being extended beyond the casing at its ends and terminating in forwardly extending horns, an auxiliary beam mounted between the horns and a poise carried by said auxiliary beam.

3. In a weighing scale, a base, a system of leverage within the base, a platform upon the system of leverage, a housing mounted upon the base, a longitudinally divided beam mounted in the housing extending beyond the housing at its ends, an auxiliary beam and poise carried by the ends of said main beam, an arm depending from said main beam, a pendulum mounted below the main beam, connections between the pendulum and said arm and an indicating hand carried by the pendulum and extending through the opening in the beam.

4. In a weighing scale, a base, a leverage system within the base, a scale platform carried by said system, a housing, an indicating chart mounted in the housing, electric lamps for illuminating the chart, a switch included in the circuit of the lamps, a beam mounted in the housing and connected with the leverage system, an indicator hand coöperating with the chart, weight-offsetting means in the housing connected with and actuated from the beam, connections from the weight-offsetting means for actuating the indicator hand, and a lug upon the beam adapted to maintain the switch in open position when the scale is in equilibrium with no weight upon the platform.

5. A stirrup for a machine element having knife edge pivots, comprising a strap, a seat block embraced between the ends of said strap, a pivot extending through the ends of the strap and through the seat block, and an agate supported by the seat block, and means for limiting the pivotal movement of the seat block.

6. A stirrup for a machine element having knife edge pivots, comprising a strap, a seat block embraced between the ends of said strap, a pivot extending through the ends of the strap and through the seat block, one end of the strap being bent under to limit the movement of the seat block, and an agate supported by the seat block.

7. A stirrup for supporting a mechanical element having a knife edge, comprising a strap, a seat block 71 mounted between the ends thereof, a pivot 73 extending through said ends and through the seat block, an agate 41 within the seat block and a plate 74 extending through the seat block and overlapping the opposite sides thereof and of the agate to prevent relative sidewise movement of the parts.

8. In a platform scale, a base having an opening at the top thereof, a main lever, weight offsetting means connected to the long arm thereof, a second lever having arms of unequal length and connections from the long arm thereof to that of the main lever, a frame supported by the short arms of the levers, a spider supported by the frame and extending through said opening in the base and a platform supported by the spider.

9. In a weighing scale, a hollow base, a main lever pivoted within the same, a weight offsetting means and connections from the same to the long arm of said main lever, a second lever and connections between the long arm of said lever and that of said main lever, said levers each comprising a transverse shaft having cross-heads at the ends thereof, a knife edge at one end of each cross-head, means for suspending said knife edge from the base, a knife edge at the opposite end of each cross-head, a frame suspended from the last mentioned knife, a spider supported upon the frame and a platform supported by the spider.

10. In a weighing scale, a hollow base, a main lever pivoted within the same, a weight offsetting means and connections from the same to the long arm of said main lever, a second lever and connections between the long arm of said lever and that of said main lever, said levers each comprising a transverse shaft having cross-heads at the ends thereof, a knife edge at one end of each cross-head, means for suspending said knife edge from the base, a knife edge at the opposite end of each cross-head, a frame suspended from the last mentioned knife edge, a spider supported by the frame having a pair of adjustable legs and a platform supported by the spider.

11. In a scale, a base having a plurality of supporting legs one of which comprises a foot, a screw pin revoluble relative to the foot and having a threaded portion and a hollow boss upon the base having an internal thread engaged by said screw pin.

12. In a weighing scale, a scale base, a platform having a depending flange surrounding the base on three sides but cut away on the fourth side and an upstanding flange on the fourth side substantially as described.

13. In a weighing scale of the platform type and in combination with the leverage system thereof, a spider resting upon the levers for supporting the platform, a shot box carried by said spider and a platform supported by the spider.

14. In a weighing scale, a housing, platform lever mechanism, a beam fulcrumed intermediate its ends within the housing, the ends of the beam extending beyond the sides of the housing, connections between the beam and the platform lever mechanism, automatic weight-offsetting mechanism connected with and actuated upon movement of the beam, and an auxiliary beam having a poise movable thereon secured to the ends of the first-mentioned beam.

15. In a weighing scale, a housing, platform lever mechanism, a beam fulcrumed intermediate its ends within the housing, the ends of the beam extending beyond the sides of the housing, connections between the beam and the platform lever mechanism, automatic weight-offsetting mechanism including a pendulum, means for displacing the pendulum upon movement of the beam, and an auxiliary beam having a poise movable thereon secured to the ends of the first-mentioned beam.

16. In a weighing scale, a housing, platform lever mechanism, a beam fulcrumed intermediate its ends within the housing, the ends of the beam extending beyond the sides of the housing, connections between the beam and the platform lever mechanism, a pendulum supported within the housing, an arm carried by said beam, connections from said arm to the pendulum whereby the latter is displaced upon movement of the beam, an auxiliary beam connected to the ends of the first-mentioned beam and having a poise movable thereon.

LEWIS CALVIN WETZEL.

Witnesses:
EDWARD F. ULRICH,
CLARENCE W. FESSENDEN.